(12) United States Patent
Conner et al.

(10) Patent No.: US 8,688,107 B2
(45) Date of Patent: Apr. 1, 2014

(54) VOICE BRIDGING GATEWAY FOR TACTICAL COMMUNICATIONS

(75) Inventors: Keith F. Conner, Boonton, NJ (US);
Joseph W. Davis, Union City, PA (US);
Mark A. Serrano, Dumont, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 48 days.

(21) Appl. No.: 13/383,138

(22) PCT Filed: Apr. 20, 2011

(86) PCT No.: PCT/US2011/033200
§ 371 (c)(1),
(2), (4) Date: May 29, 2012

(87) PCT Pub. No.: WO2011/133642
PCT Pub. Date: Oct. 27, 2011

(65) Prior Publication Data
US 2012/0231787 A1 Sep. 13, 2012

Related U.S. Application Data

(60) Provisional application No. 61/326,926, filed on Apr. 22, 2010, provisional application No. 61/326,932, filed on Apr. 22, 2010.

(51) Int. Cl.
*H04B 7/00* (2006.01)
*H04L 12/66* (2006.01)

(52) U.S. Cl.
USPC ......... 455/426.1; 455/500; 455/517; 370/353

(58) Field of Classification Search
USPC .......... 455/517, 509, 426.1, 426.2, 500, 507;
370/353; 379/202.01, 93.09, 93.21, 379/158
See application file for complete search history.

(56) References Cited

U.S. PATENT DOCUMENTS

| 7,187,763 | B1 * | 3/2007 | Kaplan .................... 379/202.01 |
| 7,598,850 | B2 * | 10/2009 | Manz ............................ 340/506 |
| 2003/0125021 | A1 | 7/2003 | Tell et al. |
| 2006/0105792 | A1 * | 5/2006 | Armbruster et al. .......... 455/517 |
| 2006/0171380 | A1 * | 8/2006 | Chia ............................ 370/352 |
| 2008/0187124 | A1 * | 8/2008 | Abramson et al. ....... 379/220.01 |
| 2009/0168766 | A1 | 7/2009 | Eysboglu et al. |
| 2013/0329884 | A1 * | 12/2013 | Silver ............................ 380/247 |

* cited by examiner

*Primary Examiner* — Nizar Sivji
(74) *Attorney, Agent, or Firm* — Leo Zucker; Daniel J. Long

(57) ABSTRACT

Each of a number of gateway network radios operates with a transmission protocol of an associated one of plural incompatible communication networks. Each network radio has an audio terminal for producing first audio signals detected from transmissions of user radios in its associated network, and a microphone terminal for receiving second audio signals for transmission to the user radios. A voice bridging gateway server has multiple ports each corresponding to one of the networks for coupling to the network radio associated with the one network. Each port receives the first audio signals from the audio terminal of the associated network radio, and produces the second audio signals for applying to the microphone terminal of the network radio. The server implements a private branch exchange application whereby user radios in a given communication network can be voice bridged with user radios in a selected one or more of the other networks.

13 Claims, 7 Drawing Sheets

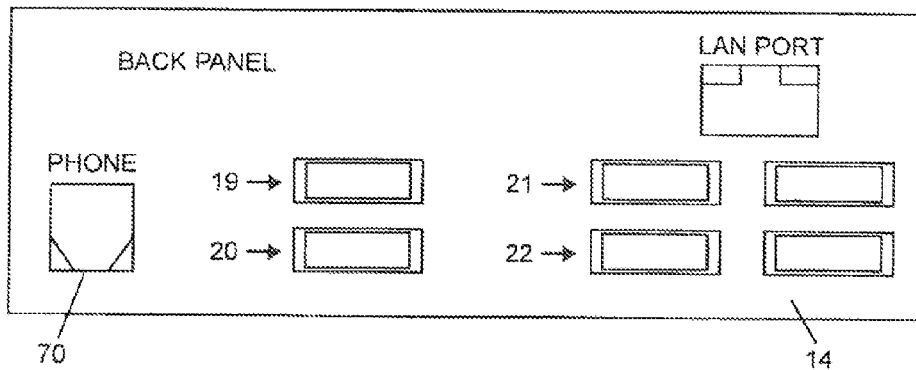

FIG. 6

| | Command | Radio Configuration | Description |
|---|---|---|---|
| 1 | saint_rpt.sh | no_radios | Disable Radio Channel |
| 2 | | radio1_2_3_4 | Independent Radios |
| 3 | | radio12_3_4 | Radio 1 and 2 are bridged |
| 4 | | radio1_23_4 | Radio 2 and 3 are bridged |
| 5 | | radio1_2_34 | Radio 3 and 4 are bridged |
| 6 | | radio13_2_4 | Radio 1 and 3 are bridged |
| 7 | | radio14_2_3 | Radio 1 and 4 are bridged |
| 8 | | radio1_24_3 | Radio 2 and 4 are bridged |
| 9 | | radio1_234 | Radio 2, 3, and 4 are bridged |
| 10 | | radio123_4 | Radio 1, 2, and 3 are bridged |
| 11 | | radio124_3 | Radio 1, 2, and 4 are bridged |
| 12 | | radio134_2 | Radio 1, 3, and 4 are bridged |
| 13 | | radio12_34 | Radio 1, 2 are bridged. Radio 3 and 4 are bridged |
| 14 | | radio13_24 | Radio 1, 3 are bridged. Radio 2 and 4 are bridged |
| 15 | | radio14_23 | Radio 1, 4 are bridged. Radio 2 and 3 are bridged |
| 16 | | radio1234 | All Radios are bridged. |

FIG. 7

VOICE BRIDGING GATEWAY FOR TACTICAL COMMUNICATIONS

CROSS REFERENCE TO RELATED APPLICATIONS

The present application claims priority under 35 U.S.C. Sec. 119(e) of U.S. Provisional Patent Application No. 61/326,926 filed Apr. 22, 2010, and titled Method and Apparatus to Provide a Situational Awareness Integrated Network Technologies (SAINT) System; and No. 61/326,932 also filed Apr. 22, 2010, and titled Method and Apparatus for a Voice Bridge Gateway (VBG). The two mentioned patent applications are incorporated herein by reference in their entireties.

BACKGROUND OF THE INVENTION

1. Field of the Invention

The present invention relates to communications systems, and particularly to a method and system for bridging voice communications.

2. Discussion of the Known Art

Many wireless voice radios and devices are unable to link with one another because of different network frequency allocations and transmission protocols, end usage, proprietary technology, and/or limitations of currently available connectivity solutions. The use of incompatible voice communication radios by first responders including fire, police and rescue personnel at an incident can cause serious problems if all responders and their lines of command are not frequently updated because of their inability to communicate with one another in real time.

A system known as First InterComm offered by BAE Systems enables responders whose radios operate on different frequencies and use different transmission protocols, to communicate with one another by using their existing radios and a separate module mounted in each responder's vehicle. When installed, the module operates to create a temporary digital mesh network that includes the vehicle in which it is mounted, and all other vehicles equipped with the module in the vicinity of the incident. Each module monitors both the mesh network and the radio channel normally used by the responder in whose vehicle the module is installed.

When a responder originates a voice message using his or her radio, the module detects the corresponding voice signal, converts it to a digital format, and relays the message digitally across the mesh network. The modules in the other responders' vehicles re-convert the digital message into an analog voice signal, and transmit the voice signal on the same RF channels and with the same modulation protocols used by each of the other responders' radios. The other responders can therefore hear the original voice message over their own radios with little if any time delay. See, U.S. Pat. No. 7,508,840 (Mar. 24, 2009), U.S. Pat. Application Pub. 2009/0174547 (Jul. 9, 2009), and U.S. Pat. Application Pub. 2009/0207852 (Aug. 20, 2009).

Notwithstanding the known art, a need continues for a system and technique for bridging voice communications among users of disparate voice communication radios that are located or may travel far away from one another, particularly during the course of military and tactical missions in potentially hostile environments.

SUMMARY OF THE INVENTION

According to the invention, a method and system for voice bridging user radios in multiple radio communication networks each of which operates according to a different radio transmission protocol that is incompatible with the protocols of the other networks, includes providing a number of gateway network radios each configured to operate according to a transmission protocol of an associated one of two or more radio communication networks whose transmission protocols are not compatible. An audio terminal of each gateway network radio produces first voice or audio signals when detected by the network radio from radio transmissions of user radios in the communication network associated with the network radio, and a microphone terminal of each network radio receives second voice or audio signals for transmission by the network radio to the user radios in the communication network associated with the network radio.

A voice bridging gateway (VBG) server is provided with a number of server ports each of which corresponds to one of the radio communication networks and is configured for coupling to a gateway network radio associated with the corresponding communication network. Each server port is operative for (a) receiving first signals corresponding to the first voice or audio signals produced from the audio terminal of the associated network radio, and (b) producing second signals corresponding to the second voice or audio signals for applying to the microphone terminal of the associated network radio.

The VBG server is configured to implement a private branch exchange (PBX) application for voice bridging user radios in a given one of the communication networks, with the user radios in a selected one or more of the other communication networks in response to a corresponding configuration command identifying the communication networks to be bridged, by (a) switching the first voice or audio signals received at the server ports coupled to the gateway network radios associated with the other selected communication networks, if any, to the server port corresponding to the given communication network for applying as the second signals to the microphone terminal of the corresponding network radio, thus allowing user radios in the given communication network to receive and detect the first voice or audio signals originating from the user radios in the other selected networks, and (b) switching the first voice or audio signals received at the server port coupled to the gateway network radio associated with the given communication network, to the server ports corresponding to the other selected communication networks, if any, for applying as the second signals to the microphone terminals of the network radios associated with the other selected communication networks, thus allowing user radios in the other selected communication networks to receive and detect the first voice or audio signals originating from the user radios in the given communication network.

For a better understanding of the invention, reference is made to the following description taken in conjunction with the accompanying drawing and the appended claims.

BRIEF DESCRIPTION OF THE DRAWING

In the drawing:

FIG. 6 shows a panel of a VBG server including a number of USB ports and a telephone communication cable connector;

FIG. 7 is a table defining different bridging configurations that the VBG can implement for four radio networks according to the invention;

DETAILED DESCRIPTION OF THE INVENTION

A tactical gateway product suite developed by BAE Systems and called Situational Awareness Integrated Network Technologies or SAINT, extends the common operating picture (COP) to the tactical edge by distributing geospatially relevant information among various participants on a given mission. SAINT leverages commercial technology and networks to provide a warfighter with on-demand location based services. Its capabilities include wireless communications using commercial off the shelf (COTS) fixed/mobile base stations, IEEE 802.11 wireless access and GFE tactical radios; geo-referenced blue force tracking, targeting, and imaging (still and video); and gateway functionality among commercial networks including MOTOTRBO, Garmin radios, SOF, and Army networks such as Land Warrior, Raptor X (SOF GIS), PRC-117G, SINCGARS, and FBCB2. The geo-referenced information may be imported from outside sources such as Land Warrior, shared by a community of local users, and exported to outside consumers of interest such as FBCB2 or CPOF.

The SAINT suite includes an application package that operates on COTS handheld hardware including smart phones, cell phones, rugged PDAs, and UMPCs that can be easily carried by soldiers on the ground and which use commercial cellular and/or IEEE 802.11 access protocols. SAINT also allows voice interoperability between mobile phones and tactical PTT radios (e.g., ATT Tilt to PRC-117G), as well as message or data interoperability across heterogeneous networks (e.g., JVMF to CoT).

Figure 1:
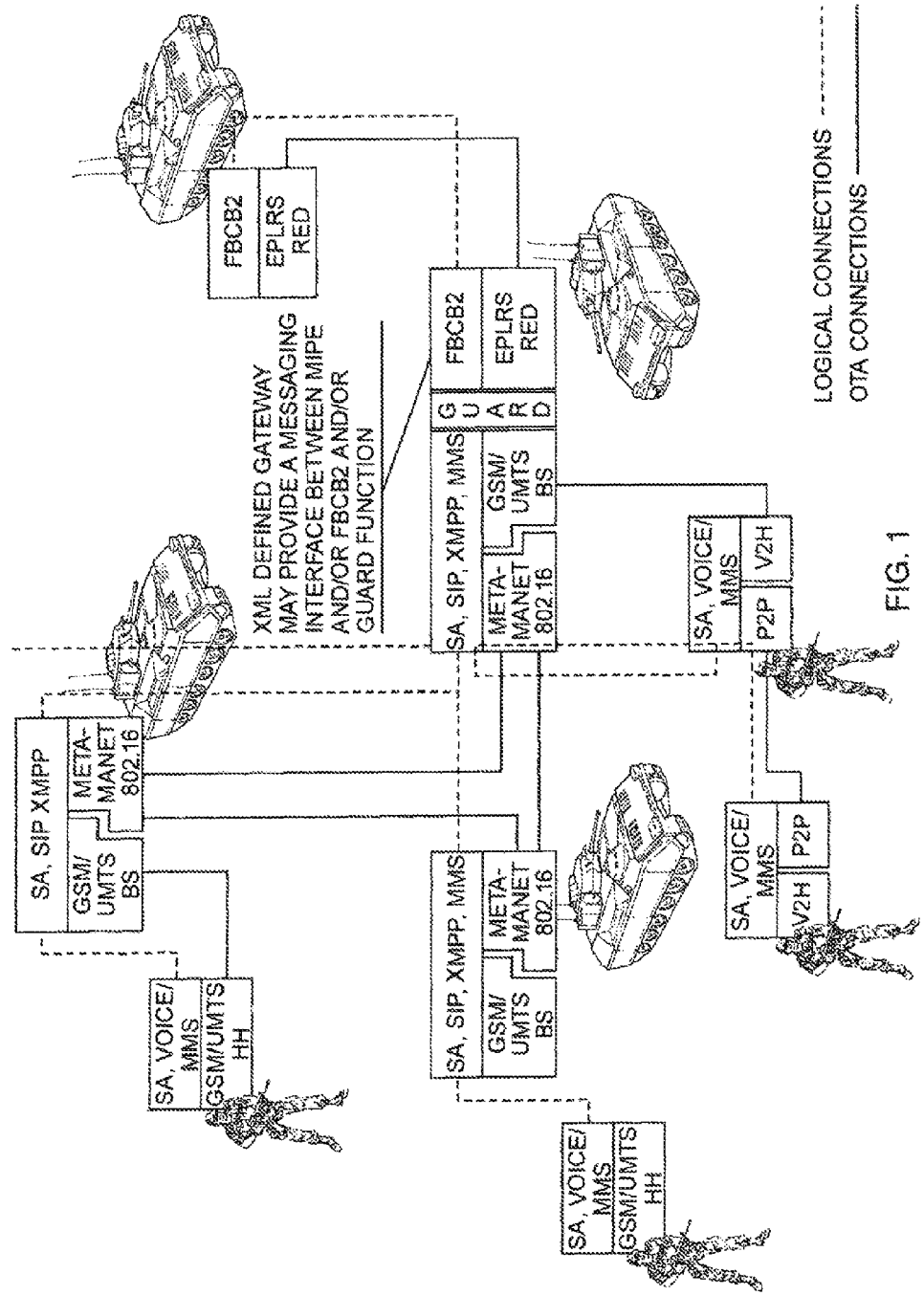
FIG. 1 is a graphic representation of a tactical communications system wherein situational awareness (SA) information from multiple sources is distributed to soldiers equipped with conventional wireless devices.

FIG. 1 illustrates the use of SAINT to provide secure location based services at low cost to tactical users, including individual dismounted soldiers carrying COTS cellular telephone or other standard handheld wireless communication devices. SAINT offers self protection by informing each warfighter of where are my buddies and where are the hostiles, providing a secure geo-referenced tactical map with points of interest (POIs) and other imagery, allowing push to talk communications over cellular networks with tactical radios such as SINCGARS, and providing interoperablity with various databases and Command and Control (C2) applications (e.g., Land Warrior and FBCB2).

The geo-referenced map may feature thumb friendly pop-up menus that allow the user to (a) add, modify, or attach comments or media files to POIs, (b) find, follow, and connect quickly to buddies, (c) access geo-referenced information such as pictures, and (d) obtain bearing and distance information to POIs. Buddy lists can provide status information and a quick interface for finding and collaborating with other users. SAINT also allows for group or individual text chat with visual indications to confirm delivery.

As mentioned, in addition to creating a tactical message gateway for interoperability with legacy situational awareness (SA) and command and control systems, the SAINT suite provides for voice bridging among non-compatible voice communication systems. The voice bridging feature, referred to herein as a Voice Bridge Gateway or VBG, is the subject of the present patent application and is described in further detail below.

Figure 2:
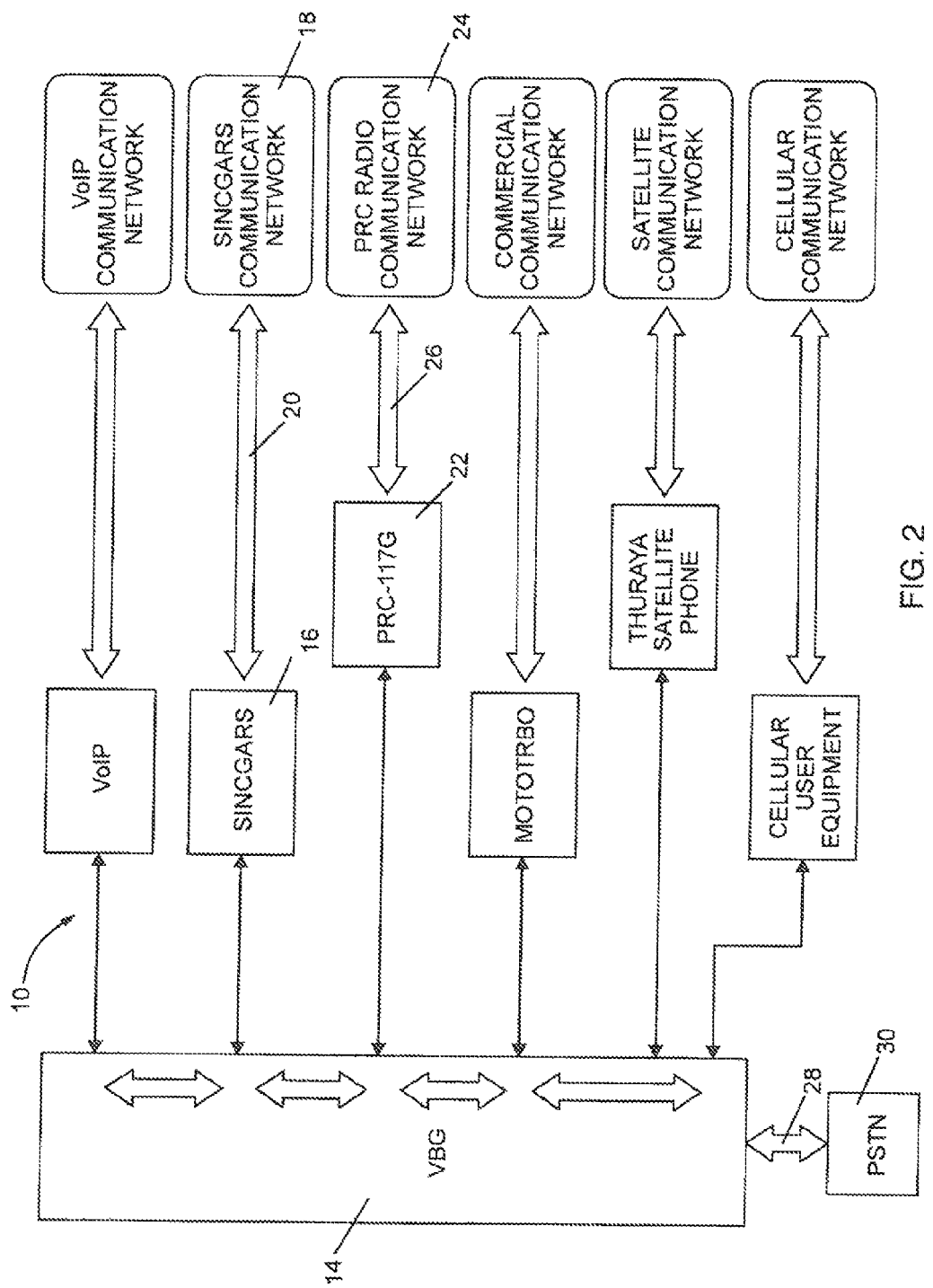
FIG. 2 is a block diagram illustrating an embodiment of the inventive voice bride gateway (VBG)

FIG. 2 is a block diagram depicting the operation of the VBG 10 to enable voice interoperability between disparate voice technologies, for example, SINCGARS to PRC-117G, and Thuraya Satellite Phone to VoIP, according to the invention. The VBG 10 combines various COTS products and available software in such a manner as to provide the warfighter with a variety of communication options. The VBG creates a network in which voice or audio signals transmitted over radio frequency (RF) channels from legacy and commercial radios, and VoIP soft phones, may be distributed selectively among all the connected radios and phones. To carry out such functions, the VBG 10 incorporates, e.g., an open Phone Branch Exchange (PBX) application such as Asterisk and conventional communications protocols such as SIP (Session Initiation Protocol).

In the disclosed embodiment, the VBG 10 is implemented on a server 14 having, inter alia, a number of USB ports configured to receive voice or audio signals originating from one or more network radios having standard audio connectors (e.g., type U-229), after the signals are converted into a digital format by USB Radio Adapters (URAs) connected to each port as described below. The USB ports are also, configured to direct voice or audio signals originating from a given network radio through the connected URAs to the audio connectors of other network radios with which the given network radio is to be bridged. For example, pin B of the mentioned U-229 connector is used as an analog audio output or speaker terminal for the associated radio, pin D is the radio's analog audio input or mic terminal and, when grounded, pin C activates push-to-talk (PPT) operation for the radio. See, http://www.prc68.com/I/U229PO.shtml.

Accordingly, in FIG. 2, if a SINCGARS radio 16 in a SINCGARS radio communication network 18 using defined wireless RF channels 20 and transmission protocols, is to be voice bridged with a PRC-117G radio 22 in a PRC radio communication network 24 that uses different RF channels 26 and protocols, the VBG 10 can bridge audio signals originating from any radio in either communication network for reception by the radios in the other network. Another desirable feature of the VBG 10 is its ability to bridge audio from one or more different network radios with a mobile, fixed, or other remote phone by use of a plain old telephone system (POTS) communication cable 28 that connects the server 14 with a public switched telephone network (PSTN) 30.

Figure 3:
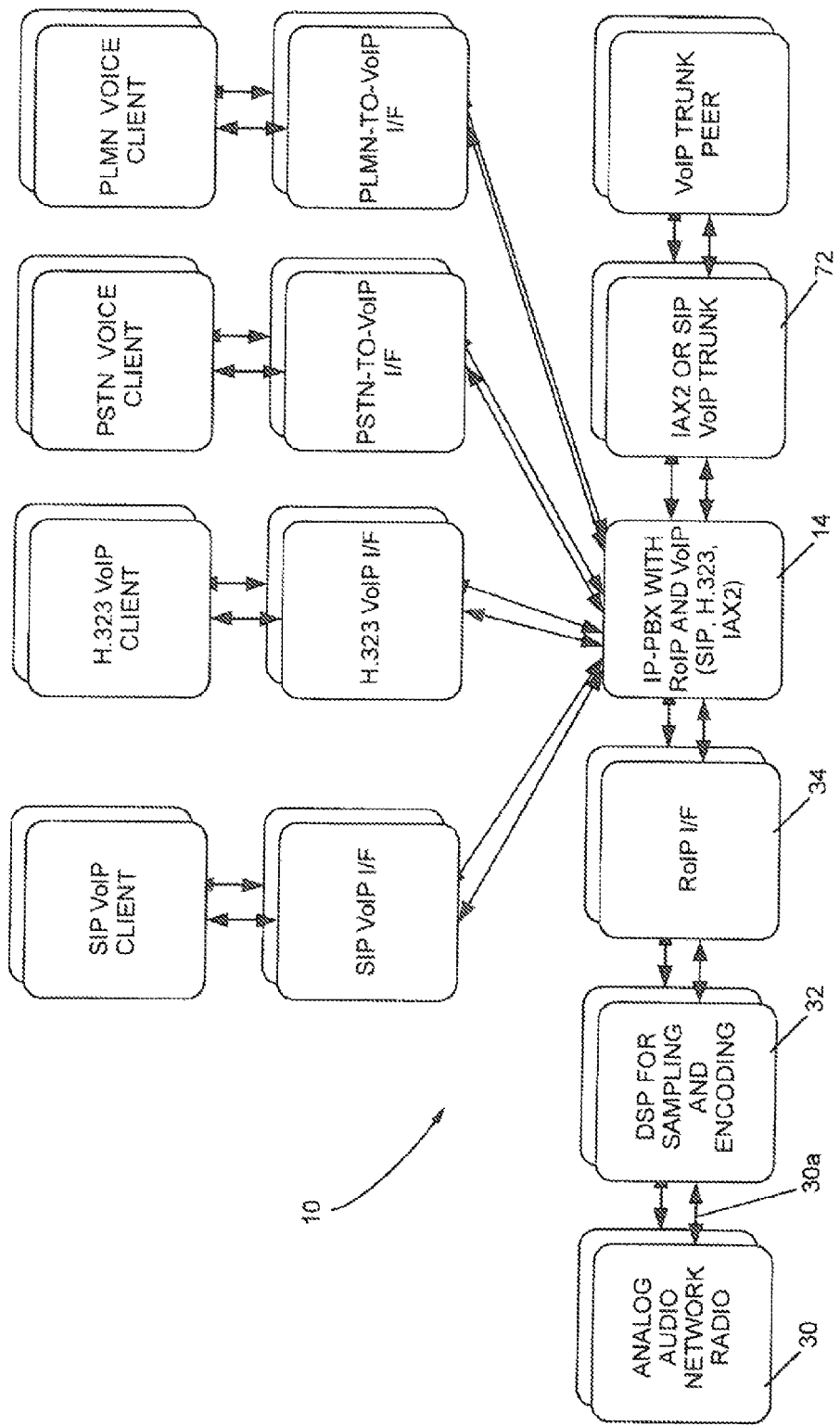
FIG. 3 is a block diagram of an architecture for the VBG.

FIG. 3 shows a preferred architecture for the VBG 10. Persons skilled in the art will understand that other architectures may also be devised and used to practice the present invention.

In FIG. 3, one or more network radios 30 each has a defined audio (e.g., headset or speaker) terminal, and a defined microphone (mic) terminal, for example, pins B and D of the mentioned U-229 connector. Each network radio 30 may be located in the vicinity of the VBG 10, and be in the form of a military or commercial PTT type two-way radio that operates to (a) monitor one or more voice channels of its associated network, and (b) transmit audio or voice signals over the channels wherein the voice signals originate from radios of other networks and/or mobile or fixed telephones linked with the VBG 10, and are selected by the VBG for transmission over the network radio's channels.

The PLMN-to-VoIP I/F in FIG. 3 may be H.323, SIP or PSTN. For example, in legacy cellular networks, a circuit-switched portion of the PLMN is routed through a mobile switching center (MSC) and onto a PSTN. If a PLMN is connected to (e.g., UMTS) or integrated with (e.g., LTE) an IP Multimedia Subsystem (IMS) core, then the PLMN-to-VoIP I/F will be SIP.

As used herein, the terms voice and audio are used interchangeably to refer to intelligible voice messages transmitted by users of radios or other communication devices (e.g., wired or wireless telephones) linked with the VBG 10, as well as audible or sub-audible tones that are transmitted alone or together with voice messages for purposes of network access, audio frequency shift keying and/or other conventional communication techniques.

Nomenclature used to label the blocks in FIG. 3 is as follows:
- DSP—Digital Signal Processor
- RoIP—Radio over Internet Protocol
- VoIP—Voice over Internet Protocol
- SIP—Session Initiation Protocol—an IETF voice call control protocol
- H.323—ITU Standard for VoIP signaling, control, and transport
- IAX2—Inter-Asterisk Exchange Protocol v.2
- IP-PBX—Internet Protocol Private Branch Exchange
- PSTN—Public Switched Telephone Network
- I/F—interface Analog audio supplied from the audio terminal of each network radio 30, is supplied through an associated cable 30a to a USB radio adapter (URA) 32. The URA 32 operates to sample and digitally encode analog audio signals detected by the associated network radio 30 on its network channels. Such encoding preferably obtains a 64 bit PCM full rate digital audio stream in a standard Radio over Internet Protocol (RoIP) format. The RoIP digital audio from the URA 32 is applied through a RoIP interface 34 within the VBG server 14 and is processed by the PBX application (e.g., Asterisk) on the server. Voice or audio to be transmitted by the network radio 30 over its associated network channels, is output from the RoIP interface 34 in the server 14 and converted into analog form by the URA 32. Analog audio from the URA 32 is applied through the cable 30a to the microphone terminal of the network radio 30.

Figure 4:
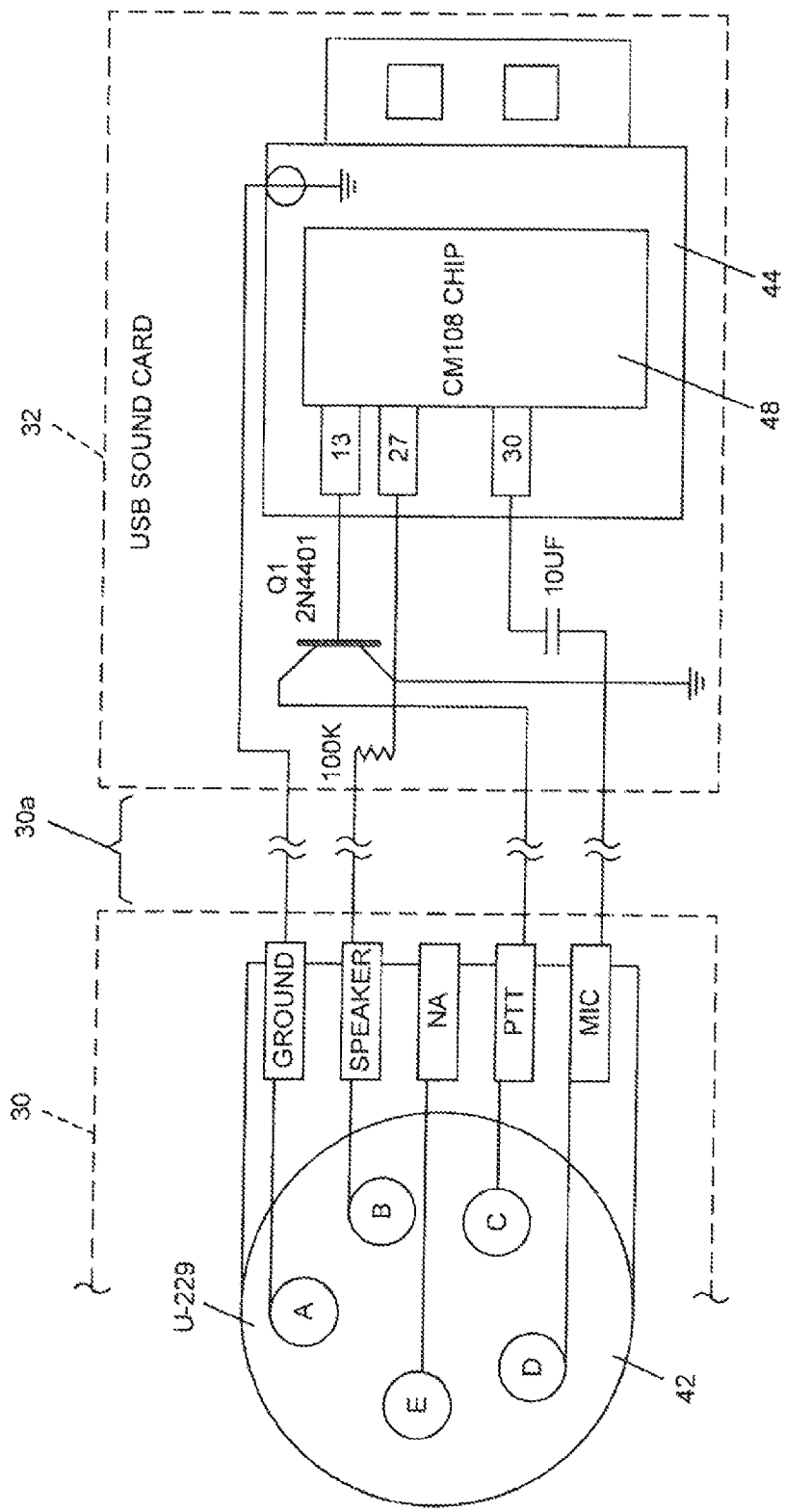
FIG. 4 is a schematic diagram of a first embodiment of a USB radio adapter (URA) and an associated cable according to the invention.

FIG. 4 is a schematic diagram showing the radio cable 30a in FIG. 3 terminated at one end with a type U-229 audio plug connector 42 for electrically connecting to a mating connector on a network radio 30. The cable 30a is terminated at the other end with a USB sound card 44 with certain discrete components to define the URA 32 in FIG. 3. The sound card 44 is preferably built around a USB audio input/output (I/O) controller such as, e.g., a type CM108 or CM119 integrated circuit chip 48 available from C-Media Electronics Inc., in Taiwan. Note that the cable 30a connects the speaker pin B of the plug connector 42 to an AI (audio in) pin no. 27 of the chip 48 through a 100 K-ohm resistor, and connects the mic pin D of the connector 42 through a 10 uf capacitor to an AO (audio out) pin no. 30 of the chip 48. Pin no. 13 of the chip 48 is configured to drive a switching transistor Q1 so as to ground the PPT pin C of the plug connector 42 through the cable 30a.

Figure 5:
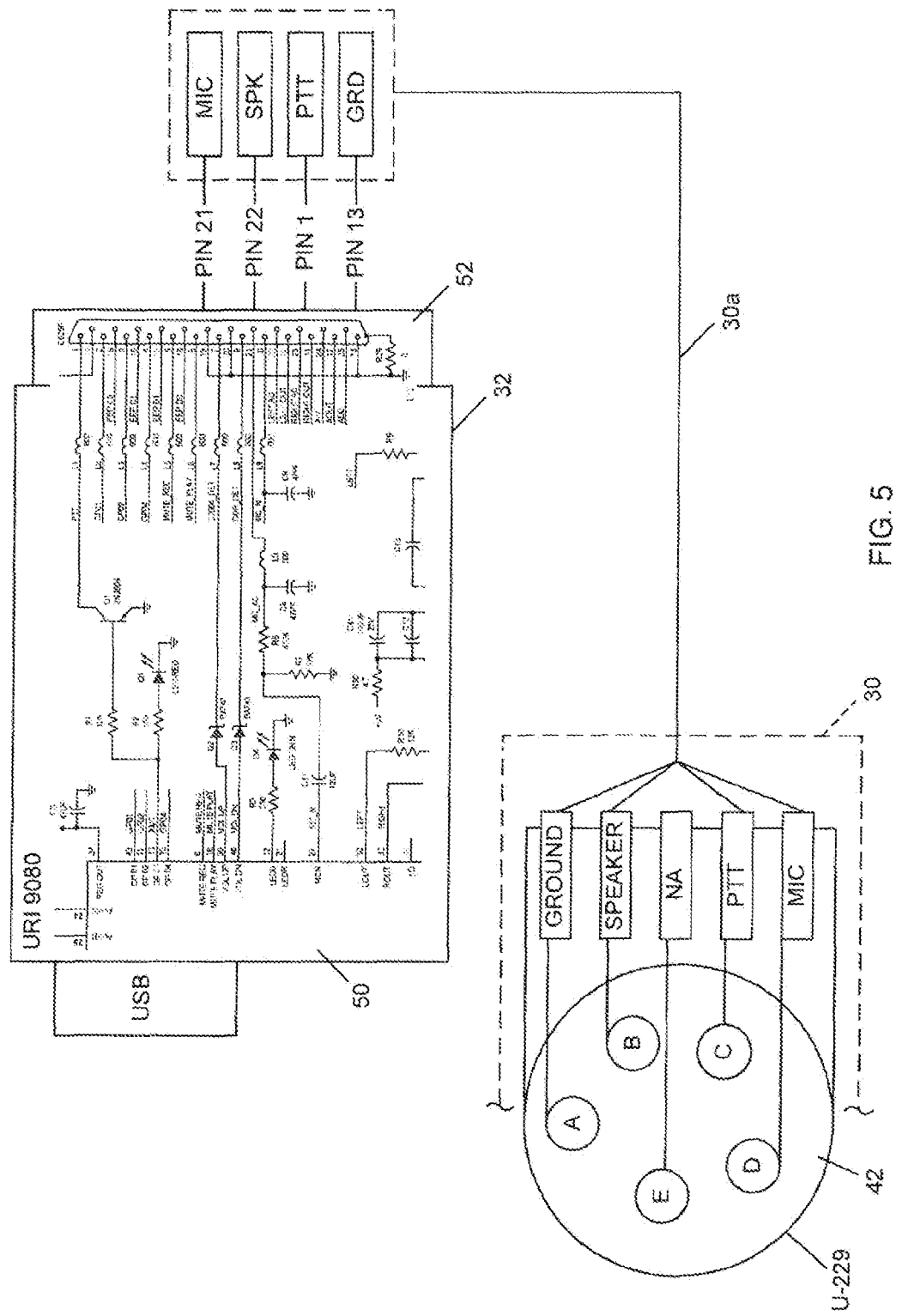
FIG. 5 is a schematic diagram of a second embodiment of a URA and an associated cable according to the invention.

FIG. 5 is a schematic diagram of another embodiment of the radio cable 30a in FIG. 3. As in FIG. 4, the cable 30a is terminated at one end with a type U-229 audio plug connector 42 for electrically connecting to a mating connector on a monitor radio 30. The other end of the cable terminates with a type 9080 USB radio interface (URI) 50 available from DMK Engineering Inc. of Rancho Palos Verdes, Calif. 90275. The DMK 9080 URI is also built around the mentioned CM108 USB audio I/O controller chip, and is provided with a standard DB-25 pin connector 52 for cable connection. Conductors in the cable 30a connect to the following pins of the DB-25 connector on the DMK 9080 URI:

| URI DB-25 Pin | Function | Connect to U-229 Pin |
| --- | --- | --- |
| 1 | PTT | C |
| 13 | GND | A |
| 21 | Mic (AC coupled) | B (Speaker) |
| 22 | Speaker (AC coupled) | D (MIC) |

Connecting the VBG Radio Cables

One or more USB radio cables 30a terminated as in either FIG. 4 or FIG. 5 may be used with the VBG 10. For the system to operate properly, it may be necessary to attach the USB connector end of the cable to a corresponding USB port on the server 14 before the server is turned on. As mentioned, the server 14 may have, e.g., four USB ports on a back panel wherein each port is configured to interface with the URA 32 on a different USB radio cable 30a. See FIG. 6. The USB ports can be numbered and associated with different extension numbers, as in the following example. The ports may also be configured manually if desired.

USB Port No.
19=Port 1=Device 4-1=6001=Extension 9101
20=Port 2=Device 4-2=6002=Extension 9102
21=Port 3=Device 3-1=6003=Extension 9103
22=Port 4=Device 3-2=6004=Extension 9104

In the above configuration, for example, a SIP user can dial 101 and the VBG 10 will operate to connect the user with the network radio 30 to which port 1 is connected through the corresponding cable 30a. The user may then communicate with other radios on the same network as the network radio 30 linked to Port 1, and with radios on other networks that are bridged with Port 1 using, e.g., a [*] key on the keypad of his/her device to key push-to-talk (PTT) operation of the radio 30 and transmit, and a [#] key to un-key the PTT operation and receive.

USB Radio Adapter Status Lights

The URAs 32 may be configured to include status lights to indicate if a given adapter is communicating with the VBG server 14 properly. For example, a steady red light may indicate that the adapter is not configured, while a blinking red light indicates the device is operating properly and is talking to the system.

Radio Group Settings

Figure 8:
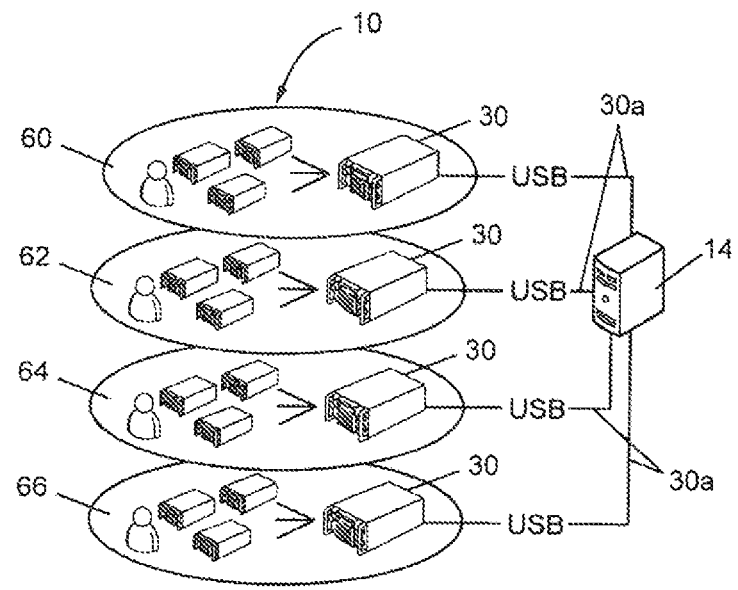
FIG. 8 shows the four radio networks in an independent or unbridged configuration.

As seen in the table of FIG. 7, the VBG 10 can implement any one of, e.g., 16 different bridging configurations for four different voice communication networks 60, 62, 64, 66 shown in FIG. 8. A desired bridging configuration may be defined on the VBG server 14 by using a configuration command such as, e.g., saint rpf.sh together with the desired configuration.

In the configuration of FIG. 8, each network is independent, i.e., the radios in each network are not bridged with radios in any of the other three networks. An example of a configuration command syntax to achieve the independent configuration of FIG. 8, is:

[root@localhost~]#saint_rpt.sh radio1__2__3__4

Figure 9:
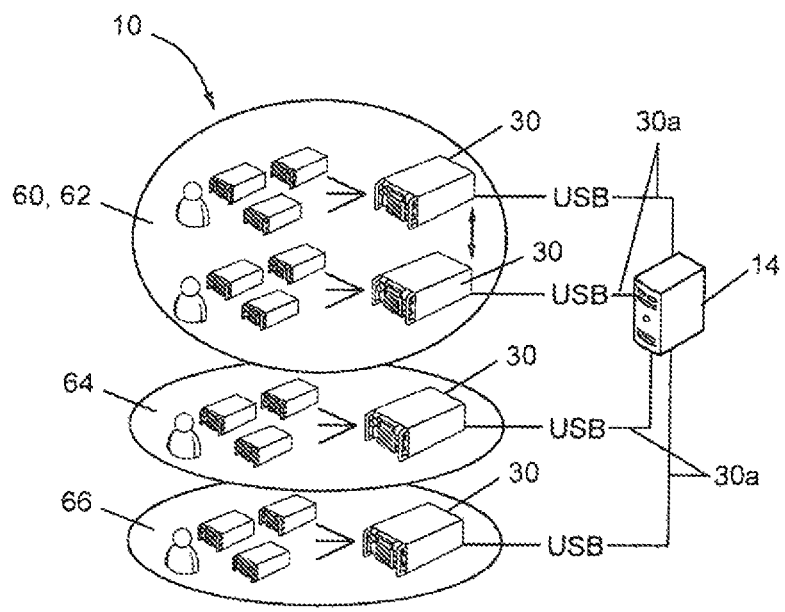
FIG. 9 shows two of the networks in FIG. 8 bridged with one another according to the invention.

FIG. 9 shows a configuration in which the radios in network 60 and the radios in network 62 are bridged, while the radios in networks 64 and 66 are not bridged out of their respective networks. A corresponding configuration command is then, for example;

[root@localhost~]#saint_rpt.sh radio12_3_4

It will be understood that with the appropriate command, configurations in which the radios of all four networks 60, 62, 64, 66 are bridged with one another, or where the radios in a given network are bridged with the radios in one or more other selected networks, can be implemented.

POTS Line Connection to PTT Radios

The VBG 10 preferably has a standard telephone connector 70 (e.g., type RJ-14) mounted on a panel of the server 14 as in FIG. 6. To enable an outside user who can access an available public switched telephone network (PSTN) with a wired or wireless phone and wants to communicate with the VBG over the POTS line 28 in FIG. 2, the telephone connector 70 on the server 14 must be connected through a phone line or cable to an active PSTN jack in the vicinity of the server.

Calling the VBG from a Phone

Once connected to a PSTN network, the VBG server 14 may be programmed to be called from any phone (a cell phone or an internal telephone handset) that has access to the PSTN. When called, the server may answer after, e.g., two rings, and a pre-recorded announcement can state: "Welcome, enter the extension of the person you are trying to call." A number of extensions may be available for use, as follows:

| Extension | Description |
|---|---|
| 9101 | Radio Network 60; Cable Port 19 |
| 9102 | Radio Network 62; Cable Port 20 |
| 9103 | Radio Network 64; Cable Port 21 |
| 9104 | Radio Network 66; Cable Port 22 |
| 8050 | Conference Room |

Radio Signal Training the VBG 10

Each time a new network radio 30 is linked with the VBG 10, certain steps should be followed to set appropriate threshold levels for voice signals and for noise that will be input to the VBG. The settings may be accomplished in a known manner using a commercially available calibrated radio communications test set, or a separate radio frequency signal generator and a modulation analyzer.

To begin a signal training session for a given network radio 30 and its associated RF channel(s), and if the mentioned Asterisk software is incorporated, a command such as the following is entered in the VBG;

[rootlocalhost-]#asterisk—vvvr

The particular network radio to be trained among, e.g., four radios identified as usb, usb1, usb2, and usb3, may be selected by entering, e.g;

>radio active usb2 to select the network radio associated with usb2. A menu list of options is then displayed, including setting voice signal and noise level thresholds for the URA 32 associated with usb2.

To make an input noise level adjustment for the URA associated with usb2, the corresponding network radio 30 must be turned on with no voice signal being received on its assigned frequency. Because the URA is connected to receive the radio's unfiltered and unsquelched voice output, the URA is subject to a maximum amplitude white noise signal from the radio. A command such as the following is then entered;

>radio tune rxnoise

The VBG server 14 is preferably configured to adjust the input threshold of the URA in view of the radio's output noise signal, and to display a Success message if the configuration is accepted.

To make a voice level adjustment for the URA 32, a command such as

>radio tune rxvoice is entered and a strong, on-channel, full-quieting RF signal modulated by a one KHz tone at 60% modulation is received by the network radio 30 associated with usb2. For example, a user of another radio on the same network may say "ahhhhh" for five seconds. The VBG 10 adjusts the threshold level of the URA for voice modulation, and outputs a Success message when the configuration is accepted. After each configuration change, the edited configuration may be saved using a command such as, e.g.;

>radio tune save

If the mentioned Asterisk PBX software is incorporated in the VBG 10, it may be required to restart the Asterisk service in order to apply the edited configurations, by entering:

>amportal kill

If the VBG monitor screen closes, a new screen may be opened upon entering:

>amportal start

Full Radio Tune Menu List and Description

The following commands may be used to invoke the described functions:

radio active—Selects by name a specific USB radio adapter (URA) for display or tuning (e.g., usb, usb1, usb2, or usb3).

radio tune—Displays information about a current active network radio 30.

radio tune rxnoise—Automatically adjusts the selected URA input sensitivity to match the maximum noise signal output from the connected network radio 30. This is the audio from the radio when no RF signal is present on the radio's receive frequency. If the USB adapter 32 is connected directly to an unmuted and unfiltered demodulated audio output terminal of the radio 30 and no RF signal is present on the radio channel, then this is the open channel reference signal. If the connection to the radio is not via an unsquelched and unfiltered audio output terminal, the maximum noise signal can be obtained by user controls to unmute the radio and open the squelch.

radio tune rxvoice—To set a selected URA radio voice level adjustment, transmit an on-channel, strong, full-quieting RF signal modulated by a 1 KHz tone at 60 percent of maximum modulation.

radio tune rxsquelch—This sets the selected URA radio noise squelch sensitivity. It provides a measurement of the current signal strength as a reference value. For example, if a configuration is needed, entering this command can display the current no-signal strength and the current squelch setting. Enter the command "radio tune rxsquelch xxx" where "xxx" is the current signal strength reading plus 150. The squelch setting can be tested and a final adjustment made later.

radio tune txtone—This sets the modulation amplitude of a sub-audible tone or data that is transmitted simultaneously with a voice signal.

radio tune txvoice—This sets the modulation amplitude of the voice signal by generating a reference signal of 1 KHz at a 60 percent modulation level.

radio tune save—This saves adjustments made to a configuration file for a specific channel. The adjustments are automatically loaded when the VBG server 14 is restarted.

As disclosed herein, it will be understood that the present invention provides a reliable, low cost interface among recent VoIP protocols for over IP communications, as well as standard H.323, SIP, PSTN, and any analog voice system.

While the foregoing represents preferred embodiments of the invention, those skilled in the art will understand that various changes and modifications may be made without departing from the spirit and scope of the invention. For example, two or more VBG servers 14 may be situated at determined locations in a defined geographic region, wherein each VBG server is linked with one or more network radios 30, and the servers are connected through a VoIP trunk. 72 in FIG. 3. It will be understood that such a configuration can enable all of the radio networks linked to the connected VGB servers to be bridged in a desired configuration by the combined operations of the servers.

It will also be understood that, as disclosed, the VGB 10 will support voice level detection (i.e., VOX) so that PTT operation via the [*] and the [#] keys on a telephone touch pad is not necessary required. PTT operation by way of the [*] and [#] keys is preferred, however, since it has been found to provide significantly better performance. Accordingly, the present invention includes all such changes and modifications as are within the scope of the following claims.

The invention claimed is:

1. A method of voice bridging user radios in multiple radio communication networks each of which networks operates according to a different radio transmission protocol that is not compatible with the protocols of the other networks, comprising:
   providing a number of gateway network radios each of which is configured to operate according to a radio transmission protocol of an associated one of two or more radio communication networks, and the protocols of the communication networks are not compatible with one another;
   defining an audio terminal of each gateway network radio for producing first voice or audio signals when detected by the network radio from radio transmissions of user radios in the communication network associated with the gateway network radio;
   defining a microphone terminal of each gateway network radio for receiving second voice or audio signals for transmission by the network radio to the user radios in the communication network associated with the network radio;
   providing a voice bridging gateway (VBG) server having a number of server ports each of which corresponds to one of the radio communication networks and is configured for coupling to a gateway network radio associated with the corresponding radio communication network, wherein each server port is operative for (a) receiving first signals corresponding to the first voice or audio signals produced from the audio terminal of the associated network radio, and (b) producing second signals corresponding to the second voice or audio signals for applying to the microphone terminal of the associated network radio; and
   configuring the VBG server to implement a private branch exchange (PBX) application for voice bridging user radios operating in a given one of the radio communication networks, with the user radios operating in a selected one or more of the other communication networks in response to a corresponding configuration command identifying the communication networks to be bridged, including;
   switching the first voice or audio signals received at the server ports coupled to the gateway network radios associated with the other selected radio communication networks, if any, to the server port corresponding to the given communication network for applying as the second signals to the microphone terminal of the corresponding network radio, thus allowing user radios in the given communication network to receive and detect the first voice or audio signals originating from the user radios in the other selected communication networks; and
   switching the first voice or audio signals received at the server port coupled to the gateway network radio associated with the given communication network, to the server ports corresponding to the other selected communication networks for applying as the second signals to the microphone terminals of the network radios associated with the other selected communication networks, thus allowing user radios in the other selected communication networks to receive and detect the first voice or audio signals originating from the user radios in the given communication network.

2. The method of claim 1, including:
   providing a telephone port on the VBG server and coupling a public switched telephone network (PSTN) to the telephone port;
   enabling a user of a telephone device on the PSTN to access the VBG server via the PSTN; and
   voice bridging the telephone device with user radios in one or more selected radio communication networks by implementing the PBX application on the VBG server.

3. The method of claim 1, wherein the configuration command is performed by entering numbers corresponding to the radio communications networks in which the user radios are to be voice bridged with one another.

4. The method of claim 3, including enabling a user of the telephone device to implement a push-to-talk (PTT) operation of the gateway network radio associated with a selected radio communications network in which the user radios are voice bridged with the telephone device.

5. The method of claim 4, including implementing the PTT operation by entering a certain symbol on a keypad of the telephone device to switch the network radio to a transmit mode of operation, and by entering a different symbol on the keypad to switch the network radio to a receive mode of operation.

6. The method of claim 1, including configuring the PBX application on the VBG server to allow each of the radio communication networks to operate independently without voice bridging the user radios in any one of the networks with the user radios in any one of the other networks.

7. A system for voice bridging user radios in multiple radio communication networks that operate according to radio transmission protocols that are not compatible with one another, comprising:
   a number of gateway network radios each configured to operate according to a radio transmission protocol of an associated one of two or more radio communication networks, and the radio transmission protocols of the networks are not compatible with one another;
   each gateway network radio has an audio terminal for producing first voice or audio signals when detected by the network radio from radio transmissions of user radios in the communication network associated with the network radio, and a microphone terminal for receiving second voice or audio signals for transmission by the gateway network radio to the user radios in the communication network associated with the network radio;

a voice bridging gateway (VBG) server or other processing platform that is programmed and configured to implement a private branch exchange (PBX) application for voice bridging the user radios in a given radio communication network with user radios a selected one or more of the other communication networks in response to a corresponding configuration command identifying the communication networks to be bridged;

the VBG server has a number of server ports each of which is associated with a corresponding radio communication network and is configured for coupling to a gateway network radio associated with the corresponding network, wherein each server port is operative to (a) receive first signals corresponding to the first voice or audio signals produced by the audio terminal of the associated network radio, and (b) produce second signals corresponding to the second voice or audio signals for applying to the microphone terminal of the associated network radio; and the VBG server is constructed and arranged to implement a private branch exchange (PBX) application for voice bridging user radios operating in a given one of the radio communication networks, with the user radios operating in a selected one or more of the other communication networks;

wherein the PBX application is configured and operative to (a) switch the first voice or audio signals received at the server ports coupled to the gateway network radios associated with the other selected radio communication networks, if any, to the server port corresponding to the given communication network for applying as the second signals to the microphone terminal of the corresponding network radio, so that user radios in the given communication network are able to receive and detect the first voice or audio signals originating from the user radios in the other selected communication networks; and (b) switch the first voice or audio signals received at the server port coupled to the gateway network radio associated with the given communication network, to the server ports corresponding to the other selected communication networks if any, for applying as the second signals to the microphone terminals of the network radios associated with the other selected communication networks, so that user radios in the other selected communication networks are able to receive and detect the first voice or audio signals originating from the user radios in the given communication network.

8. A system according to claim 7, including a telephone port arranged on the VBG server for connection with a public switched telephone network (PSTN), wherein the telephone port is configured so that a user of a wired or a wireless telephone device on the PSTN can access the VBG server via the PSTN, and voice bridge the telephone device with user radios in a selected one or more of the radio communication networks by operation of the PBX application on the VBG server.

9. A system according to claim 7, wherein the configuration command includes numbers corresponding to the radio communications networks in which the user radios are to be voice bridged with one another.

10. A system according to claim 9, wherein the PBX application is configured to implement a push-to-talk (PTT) operation of the gateway network radio associated with a selected communication network in which the user radios are voice bridged with the telephone device.

11. A system according to claim 10, wherein the PBX application is configured to enable the user of the telephone device to activate a transmit mode of operation of the associated gateway network radio in response to an entry of a certain symbol on the keypad of the device, and to activate a receive mode of operation of the network radio in response to an entry of a different symbol on the keypad.

12. A system according to claim 7, including multiple lengths of cable wherein each length of cable contains a number of conductors, and at least some of the conductors of a given length of cable terminate at one end of the cable at corresponding terminals of an associated radio adapter, and the conductors terminate at an opposite end of the cable at the audio and the microphone terminals of an associated gateway network radio, and wherein the radio adapter is configured to encode analog audio signals produced at the audio terminal of the associated network radio into a digital audio stream for input to a corresponding server port of the VBG server, and to convert digital audio signals produced at the server port into analog audio signals for applying to the microphone terminal of the associated gateway network radio.

13. A system according to claim 12, wherein the radio adapter is constructed and arranged for connection to a USB port that forms one of the server ports on the server.

* * * * *